United States Patent
Toy et al.

(10) Patent No.: US 11,761,736 B2
(45) Date of Patent: Sep. 19, 2023

(54) MOVABLE SIGHT FRAME ASSEMBLY FOR A WEAPON SIMULATOR

(71) Applicant: Raytheon Company, Waltham, MA (US)

(72) Inventors: Gregory K. Toy, Tucson, AZ (US); Roger C. Esplin, Marana, AZ (US); Christopher A. Velez, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 357 days.

(21) Appl. No.: 16/988,288

(22) Filed: Aug. 7, 2020

(65) Prior Publication Data
US 2022/0042771 A1    Feb. 10, 2022

(51) Int. Cl.
*F41G 3/26*    (2006.01)
*G06F 3/01*    (2006.01)

(52) U.S. Cl.
CPC ............... *F41G 3/26* (2013.01); *G06F 3/012* (2013.01)

(58) Field of Classification Search
CPC   F41G 3/26; G06F 3/012; G09B 9/006; G09B 9/003
USPC .......................................................... 434/19
See application file for complete search history.

(56) References Cited

U.S. PATENT DOCUMENTS

| 2,644,237 A | 7/1953 | Pachmayr |
| 2,814,118 A | 11/1957 | Evans, et al. |
| 3,732,642 A | 5/1973 | Bray |
| 3,890,879 A | 6/1975 | Looger et al. |
| 4,534,735 A | 8/1985 | Allard et al. |
| 5,256,066 A | 10/1993 | Larussa |
| 5,272,514 A | 12/1993 | Dor |
| 5,340,115 A | 8/1994 | Shirai et al. |
| 5,641,288 A * | 6/1997 | Zaenglein, Jr. ....... F41G 3/2633 434/21 |

(Continued)

FOREIGN PATENT DOCUMENTS

| WO | WO-2016024921 A1 | 2/2016 |
| WO | WO-2022032145 A1 | 2/2022 |

OTHER PUBLICATIONS

"How To Fire A Stinger Missile FIM-92 Stinger In Action", GHV. YouTube, [Online]. Retrieved from the Internet: <URL: https://www.youtube.com/watch?v=q0nuhl05QyA>, (Mar. 31, 2015), 1 pg.

(Continued)

*Primary Examiner* — Robert P Bullington
*Assistant Examiner* — Stephen Alvesteffer
(74) *Attorney, Agent, or Firm* — Schwegman Lundberg & Woessner, P.A.

(57) ABSTRACT

A sight frame assembly for a weapon simulator includes one or more connection arms. The connection arms are for slidably coupling the sight frame assembly to the weapon simulator. The connection arms include a passageway for slidably receiving a guide rod that is attached to a sight frame assembly mounting point on the weapon simulator. A spring is positioned in proximity to the guide rod. The sight frame assembly is disposed in a first position along a longitudinal axis of the weapon simulator when the spring is in an uncompressed state, and the sight frame assembly is disposed in a second position along the longitudinal axis of the weapon simulator when the spring is in a compressed state.

20 Claims, 2 Drawing Sheets

(56) References Cited

U.S. PATENT DOCUMENTS

| | | | |
|---|---|---|---|
| 5,659,965 | A | 8/1997 | Thibodeau et al. |
| 5,690,492 | A | 11/1997 | Herald |
| 6,296,486 | B1 | 10/2001 | Cardaillac et al. |
| 8,407,926 | B2 | 4/2013 | Jung et al. |
| 8,675,183 | B1 * | 3/2014 | Jaklitsch ............ F41G 7/224 356/22 |
| 8,714,073 | B2 | 5/2014 | Burzel |
| 9,404,711 | B1 | 8/2016 | Hartley et al. |
| 10,048,039 | B1 | 8/2018 | Bell et al. |
| 2003/0056417 | A1 * | 3/2003 | Horton ............ F41G 11/007 42/124 |
| 2007/0009860 | A1 | 1/2007 | Young |
| 2010/0059033 | A1 * | 3/2010 | Gore ............ F41B 11/642 124/68 |

OTHER PUBLICATIONS

"Virtual Stinger Trainer (VST)", Aegis TG. YouTube, [Online]. Retrieved from the Internet: <URL: https://www.youtube.com/watch?v=fBqbdVHmPzM>, (Apr. 23, 2018), 1 pg.

"AEgis Technologies Displays Integrated Training Solutions at I/ITSEC 2017—UAS Vision", <https://www.uasvision.eom/2017/ll/16/aegis-technologies-displays-integrated-training-solutions-at-iitsec-2017/>, (Nov. 16, 2017), 7 pgs.

"International Application Serial No. PCT/US2021/045022, International Search Report dated Nov. 24, 2021", 5 pgs.

"International Application Serial No. PCT/US2021/045022, Written Opinion dated Nov. 24, 2021", 6 pgs.

"Mission training on a digital battlefield—Stinger Virtual Trainer offers troops a hyperreaiistic experience", <https://www.raytheonmissilesanddefense.com/news/feature/stinger-virtual-trainer>, (Apr. 19, 2021), 1-4.

"International Application Serial No. PCT US2021 045022, International Preliminary Report on Patentability dated Feb. 16, 2023", 8 pgs.

\* cited by examiner

MOVABLE SIGHT FRAME ASSEMBLY FOR A WEAPON SIMULATOR

TECHNICAL FIELD

The present disclosure relates to a sight frame assembly for a training aids, devices, simulators, and simulations (TADSS) device, and in an embodiment, but not by way of limitation, a movable sight frame assembly for a man portable air defense system (MANPADS) weapon simulator.

BACKGROUND

Training systems have been developed for personal-portable air defense systems. These training systems are commonly referred to as training aids, devices, simulators, and simulations (TADSS). An example of a TADSS device is a Man Portable Air Defense System (MANPADS) weapon simulator. However, when military personnel use these training devices for training in a virtual environment, the virtual reality (VR) head mounted display (HMD) adds extra bulk to the trainee's head. This prevents the trainee from placing their head in the proper position next to the training device, and in particular, up against the sight frame assembly on a MANPADS weapon simulator. This in turn makes it more difficult and significantly less realistic for the trainee to properly align the TADSS device while training to aim and engage targets in VR. Since the sight frame assembly is critical in properly deploying and aiming tactical MANPADS, the training experience is less than ideal when the trainee cannot place their head in the proper position relative to the weapon simulator and the sight frame assembly.

DETAILED DESCRIPTION

Figure 1:
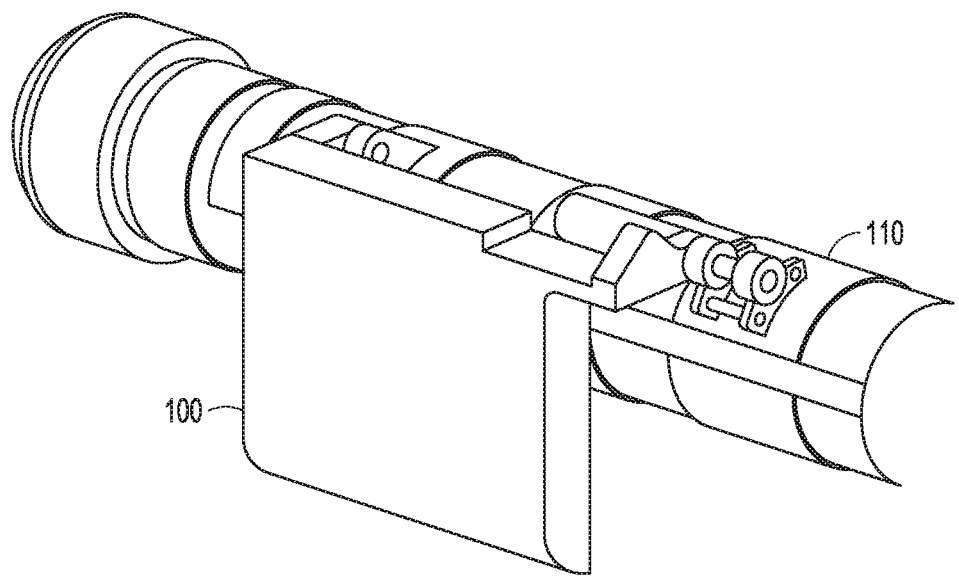
FIG. 1 is a perspective view of a weapon simulator device with a sight frame assembly in a stowed position.

In the following description, for purposes of explanation, numerous specific details are set forth in order to provide a thorough understanding of the various aspects of different embodiments of the present invention. It will be evident, however, to one skilled in the art that the present invention may be practiced without all the specific details and/or with variations, permutations, and combinations of the various features and elements described herein.

An embodiment of the present disclosure relates to a new sight frame assembly that provides clearance to accommodate a virtual reality (VR) head mounted display (HMD) while simultaneously giving the user of a Man Portable Air Defense System (MANPADS) weapon simulator the tactile feel of putting their face up to a physical sight frame assembly on a tactical weapon system. As noted above, such a MANPADS weapon simulator is an instantiation of a training aids, devices, simulators, and simulations (TADSS) device. The embodiment matches the weight and feel of an operable Man Portable Air Defense System. The embodiment includes a self-adjusting mechanism, which further allows for clearance to accommodate the VR HMD while simultaneously self-adjusting for persons with different head sizes. The self-adjusting mechanism includes placing the entire sight frame assembly on a sliding pin and spring combination so that the trainee can properly position their head to aim down the sights in the computer-generated simulation environment. While several embodiments are discussed in connection with MANPADS and TADSS devices, the current disclosure is not limited to MANPADS and TADSS devices, or other man portable air defense weapon simulators, but are applicable to any weapon simulators in general, such as in computer video games.

Additionally, an embodiment allows use of a physical sight frame assembly to interact with a TADSS device in a virtual environment. The use of a physical sight frame assembly provides a more realistic training environment to the user. In a situation using a tactical MANPADS, the user puts their head up next to the launcher and the sight frame assembly, which is part and parcel of the launcher. However, in a simulation environment, the VR HMD is in the way, and the training scenario loses an element of realism. For example, in a simulation environment, the aiming apparatus that is present on a tactical MANPADS launcher are simulated in the VR HMD. Unfortunately, lining up the front and rear sights can be very difficult for the user in the simulated environment. The bulk of the VR HMD prevents the user from placing their head in the correct position so that the user can line up the aiming apparatus in the simulation environment. However, in an embodiment, the TADSS device maintains the same feel as in a tactical firing of a man portable air defense system. An advantage of the embodiment is that it does not permit the user to improperly hold the TADSS device while firing a shot, thereby reinforcing negative training feedback.

Military doctrine obligates service members with the responsibility for safe weapon handling and placement of accurate effective fire on threat targets. To achieve this, service members train to properly utilize the sights and aiming apparatuses inherent to their weapon systems. As such, removal or non-inclusion of the physical sight frame assembly from a TADSS device is unacceptable for several reasons. First, military training doctrine requires training in the use of organic weapon sights for any given weapon system. Second, while training in VR it can be difficult for the user to line their eye up correctly with the aiming apparatus due to the physical interference between the VR HMD and the weapon simulator. Third, without physical guidance and feedback, the user's head could be positioned incorrectly while still allowing the trainee to fire and engage virtual targets. This enforces negative training through incorrect procedures and improper muscle memory.

Because in an embodiment the physical sight frame assembly was not removed from the TADSS device, it provides a user with the physical feedback necessary to verify the user's head is in the correct place and position. In lieu of completely removing the sight frame assembly from the TADSS device, a suitable length of the sight frame assembly is removed from the sight frame assembly (which in an embodiment is approximately 4 inches) on the TADSS device in order to accommodate the bulky VR HMD that is worn by the user.

The new sight frame assembly for a TADSS device has the following advantages. The sliding pin and spring combination accommodates trainees of all sizes and shapes. The training system retains a deployed "lock up" feature and also a stowed "lock down" feature of a sight frame assembly that is used on the tactical implementation of the physical weapon system. The system further includes a section of padded foam that protects the VR HMD from damage and gives the user/trainee a comfortable, no-slip rest for their head. The system allows the user to physically interact with the sight frame assembly while engaged in a virtual reality scenario. In short, the system permits a user to train for tactical employment of a MANPADS or other weapon system in an extremely realistic fashion using the physical hardware of a TADSS device and sight frame assembly positioned on the TADSS device.

Figure 2:
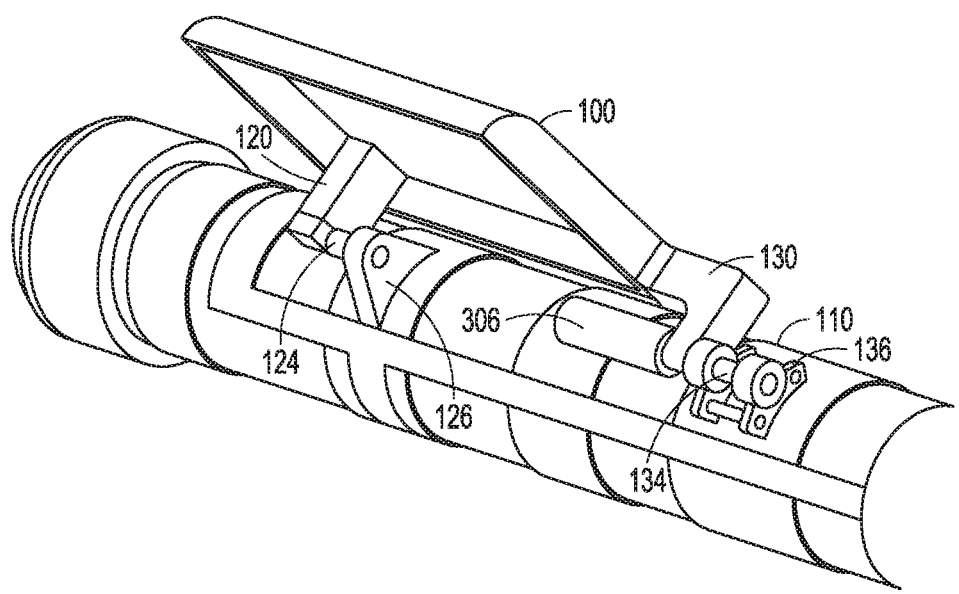
FIG. 2 is a perspective view of a weapon simulator device with a sight frame assembly in a deployed position.
Figure 3:
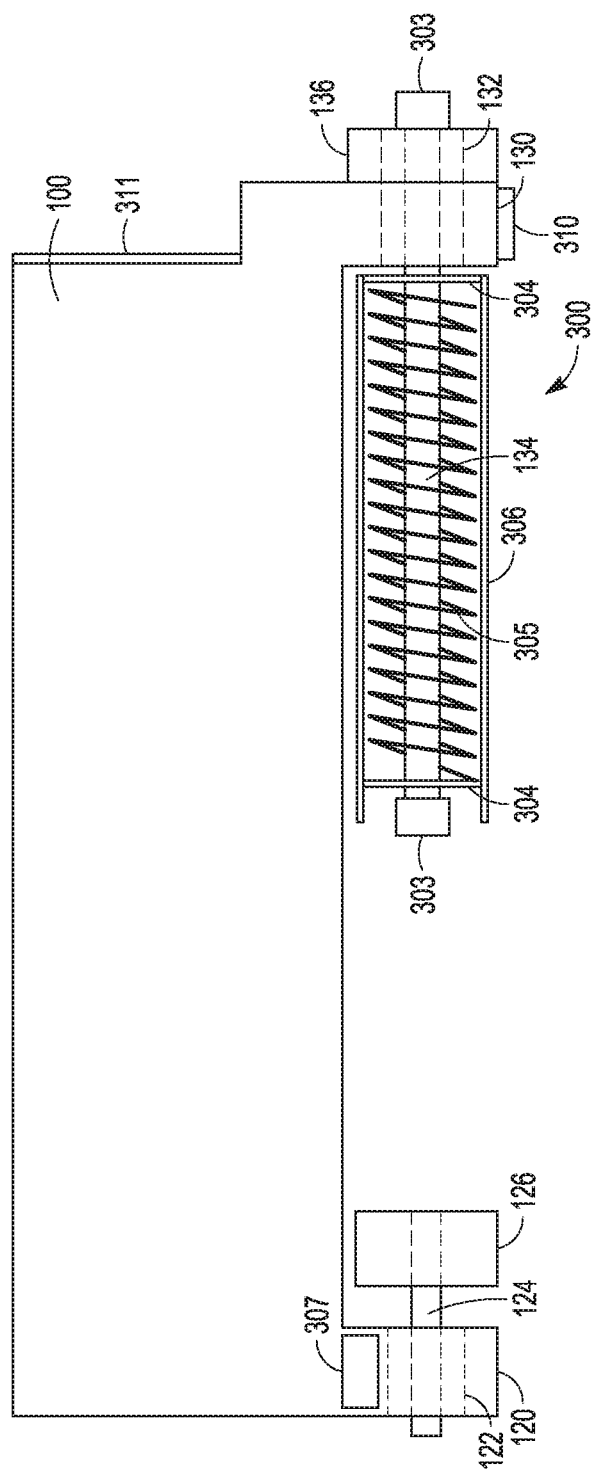
FIG. 3 is a cross-sectional view of a mechanism that permits a sight frame assembly to move in relation to a weapon simulator device.

FIGS. 1, 2, and 3 illustrate a sight frame assembly 100 for a MANPADS weapon simulator. As noted above, such MANPADS weapon simulators can be referred to as TADSS devices. The sight frame assembly 100 is coupled to a TADSS device 110. In FIG. 1, the sight frame assembly 100 is in a stowed position. In FIG. 2, the sight frame assembly 100 is in a deployed position.

The sight frame assembly 100 has a first connection arm 120, and a second connection arm 130. The first and second connection arms are slidably coupled to the TADSS device. The slidable coupling is accomplished in an embodiment via a first passageway 122 in the first connection arm 120 and a second passageway 132 in the second connection arm 130 (See FIG. 3). The first passageway 122 slidably receives a first guide rod 124. The first guide rod 124 is attached to a first sight frame assembly mounting point 126 on the TADSS device 110. Similarly, the second passageway 132 slidably receives a second guide rod 134. The second guide rod is attached to a second sight frame assembly mounting point 136 on the TADSS device 110.

Referring now more specifically to FIG. 3, the details of a spring assembly 300 are illustrated. The spring assembly 300 permits the sight frame assembly 100 to slidably move in a first direction along the longitudinal axis to the front of the TADSS device upon an application of pressure to the spring. The spring frame assembly 300 further permits the sight frame assembly 100 to slidably move is a second direction along the longitudinal axis to the rear of the TADSS device upon a release of pressure from the spring. The pressure is applied to the spring when a user, wearing a VR HMD, places the headset against the rear portion of the sight frame assembly 100, and applies pressure to move the sight frame assembly towards the front of the TADSS device. This application of pressure, compression of the spring, and resulting slidable movement along the longitudinal axis of the TADSS device, result in the sight frame assembly being moved to a position that permits the user to properly aim down the sights in the virtual environment. The slidable movement allows for different head shapes and sizes of different users, and different sizes of VR HMDs, yet still permits the user to properly position their head and VR HMD to properly aim down the sights. The spring can be either in a fully compressed state or a partially compressed state. When the user removes their head and VR HMD from the TADSS device, this action releases the pressure on the spring, and the sight frame assembly returns to its relaxed position. Upon release of the pressure, the spring can be in a fully uncompressed state or a partially uncompressed state.

FIG. 3 further illustrates details of the spring and rod assembly 300. The spring 305 is concentrically positioned around the second guide rod 134. The spring and rod arrangement are housed within a housing 306. The spring and rod arrangement are further held in place by fasteners, such as a combination of locknuts 303 and washers 304. Specifically, the locknuts 303 and washers 304 hold the rod and spring assembly in place in the second passageway 132 of the second arm 130 of the sight frame assembly 100. When pressure is applied to the foam padding 311 that is positioned on the rear edge of the sight frame assembly, the sight frame assembly moves along the two rods 122, 132 and along the longitudinal axis of the TADSS device 110. As noted earlier, the sight frame assembly is of a length that accommodates a user wearing a virtual reality headset. This length in an embodiment is shorter than the tactical sight frame assembly on a tactical weapon system by a measure roughly equivalent to the depth of the HMD.

FIG. 3 also illustrates a first retention clip 307 and a second retention clip 310. The first retention clip 307 is coupled to the first connection arm 120. The second retention clip 310 is coupled to the second connection arm 130. As is known in the art, the first retention clip 307 is used to maintain the sight frame assembly in a stowed position, and the second retention clip 310 is used to maintain the sight frame assembly in the deployed position.

Although embodiments have been described with reference to specific examples, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A sight frame assembly for a weapon simulator comprising:
   a first connection arm for slidably coupling the sight frame assembly to the weapon simulator;
   a first passageway positioned in the first connection arm, the first passageway for slidably receiving a first guide rod that is fixedly attached to a first sight frame assembly mounting point on the weapon simulator;
   a second connection arm for slidably coupling the sight frame assembly to the weapon simulator;
   a second passageway positioned in the second connection arm, the second passageway for receiving a second guide rod that is fixedly attached to a second sight frame assembly mounting point on the weapon simulator; and
   a spring concentrically positioned around the second guide rod;
   wherein the sight frame assembly is disposed in a first position along a longitudinal axis of the weapon simulator when the spring is in an uncompressed state;
   wherein the sight frame assembly is disposed in a second position along the longitudinal axis of the weapon simulator when the spring is in a compressed state; and
   wherein the first passageway and the first guide rod permit movement of the sight frame assembly along the longitudinal axis of the weapon simulator.

2. The sight frame assembly of claim 1, wherein the sight frame assembly is operable to slidably move in a first direction along the longitudinal axis of the weapon simulator upon an application of pressure to the spring and wherein the sight frame assembly is operable to slidably move is a second direction along the longitudinal axis of the weapon simulator upon a release of pressure from the spring.

3. The sight frame assembly of claim 1, comprising a first retention clip coupled to the first connection arm, the first retention clip for maintaining the sight frame assembly in a stowed position.

4. The sight frame assembly of claim 1, comprising a second retention clip coupled to the second arm, the second retention clip for maintaining the sight frame assembly in a deployed position.

5. The sight frame assembly of claim 1, comprising a housing for containing the second guide rod and the spring.

6. The sight frame assembly of claim 1, wherein the weapon simulator comprises a man portable air defense (MANPAD) virtual trainer.

7. The sight frame assembly of claim 1, wherein the uncompressed state of the spring comprises a fully uncompressed state or a partially uncompressed state.

8. The sight frame assembly of claim 1, wherein the compressed state of the spring comprises a fully compressed state or a partially compressed state.

9. The sight frame assembly of claim 1, wherein the sight frame assembly comprises a length to accommodate a user wearing a virtual reality head mounted display.

10. The sight frame assembly of claim 1, wherein the weapon simulator comprises a virtual trainer launcher.

11. A weapon simulator comprising:
a sight frame assembly, the sight frame assembly comprising:
a first connection arm for slidably coupling the sight frame assembly to the weapon simulator;
a first passageway positioned in the first connection arm, the first passageway for slidably receiving a first guide rod that is fixedly attached to a first sight frame assembly mounting point on the weapon simulator;
a second connection arm for slidably coupling the sight frame assembly to the weapon simulator;
a second passageway positioned in the second connection arm, the second passageway for receiving a second guide rod that is fixedly attached to a second sight frame assembly mounting point on the weapon simulator; and
a spring concentrically positioned around the second guide rod;
wherein the sight frame assembly is disposed in a first position along a longitudinal axis of the weapon simulator when the spring is in an uncompressed state;
wherein the sight frame assembly comprises a length to accommodate a user wearing a virtual reality head mounted display; and
wherein the sight frame assembly is disposed in a second position along the longitudinal axis of the weapon simulator when the spring is in a compressed state.

12. The weapon simulator of claim 11, wherein the sight frame assembly is operable to slidably move in a first direction along the longitudinal axis of the weapon simulator upon an application of pressure to the spring and wherein the sight frame assembly is operable to slidably move is a second direction along the longitudinal axis of the weapon simulator upon a release of pressure from the spring.

13. The weapon simulator of claim 11, comprising a first retention clip coupled to the first connection arm, the first retention clip for maintaining the sight frame assembly in a stowed position.

14. The weapon simulator of claim 11, comprising a second retention clip coupled to the second arm, the second retention clip for maintaining the sight frame assembly in a deployed position.

15. The weapon simulator of claim 11, comprising a housing for containing the second guide rod and the spring.

16. The weapon simulator of claim 11, wherein the uncompressed state of the spring comprises a fully uncompressed state or a partially uncompressed state.

17. The weapon simulator of claim 11, wherein the compressed state of the spring comprises a fully compressed state or a partially compressed state.

18. The weapon simulator of claim 11, wherein the sight frame assembly comprises a length to accommodate a user wearing a virtual reality headset.

19. A sight frame assembly for a weapon simulator comprising:
a first connection arm for slidably coupling the sight frame assembly to the weapon simulator;
a first passageway positioned in the first connection arm, the first passageway for slidably receiving a first guide rod that is fixedly attached to a first sight frame assembly mounting point on the weapon simulator; and
a spring concentrically positioned around the first guide rod;
wherein the sight frame assembly is disposed in a first position along a longitudinal axis of the weapon simulator when the spring is in an uncompressed state;
wherein the sight frame assembly is disposed in a second position along the longitudinal axis of the weapon simulator when the spring is in a compressed state; and
wherein the spring is in the compressed state when a user, wearing a virtual reality headset, applies pressure by placing the virtual reality headset against the rear portion of the sight frame assembly.

20. The sight frame assembly of claim 19, comprising:
a second connection arm for slidably coupling the sight frame assembly to the weapon simulator; and
a second passageway positioned in the second connection arm, the second passageway for receiving a second guide rod that is fixedly attached to a second sight frame assembly mounting point on the weapon simulator.

* * * * *